United States Patent [19]

Motegi

[11] Patent Number: 5,255,275
[45] Date of Patent: Oct. 19, 1993

[54] SOLID STATE LASER
[75] Inventor: Tetsuya Motegi, Higashikurume, Japan
[73] Assignee: Hoya Corporation, Tokyo, Japan
[21] Appl. No.: 921,245
[22] Filed: Jul. 29, 1992
[30] Foreign Application Priority Data
Jul. 30, 1991 [JP] Japan ................... 3-189957
[51] Int. Cl.⁵ .............................................. H01S 3/13
[52] U.S. Cl. ....................................... 372/29; 372/99; 372/108
[58] Field of Search ........................... 372/29, 99, 108; 359/663, 718

[56] References Cited
U.S. PATENT DOCUMENTS 4,553,244 11/1985 Benedict et al. ................... 372/99
4,872,181 10/1989 Johnson et al. ................... 372/108
4,955,725 9/1990 Johnson et al. ................... 372/108

Primary Examiner—Rodney B. Bovernick
Assistant Examiner—Robert E. Wise
Attorney, Agent, or Firm—Oliff & Berridge

[57] ABSTRACT

A solid state laser provided with a solid state laser medium, a laser-medium pumping unit for performing an optical-pumping of the solid state laser medium, an optical reflection unit having a pair of a total reflection member for performing a total reflection of oscillating laser light and an output member for transmitting and outputting a part of the oscillating laser light, a reflection surface of which is coated with a reflection film having a Gaussian-type reflectivity distribution in the direction perpendicular to an optical axis of the solid state laser medium. In this solid state laser, the radius of curvature of the reflection surface of the output member, is established in such a manner that laser oscillation is efficiently performed between the total reflection member and the output member. Moreover, the radius of curvature of an output surface of the output member is established in such a way that rays of resonance light, which are incident through the solid state laser medium thereon when laser oscillation is effected, become parallel rays. Incidentally, the resonance light includes converging light and diverging light. Thus laser oscillation can be efficiently effected. Further, even when solid state laser medium causes a thermal lensing effect, laser output light with large output power and high-quality can be surely obtained as parallel rays.

11 Claims, 3 Drawing Sheets

SOLID STATE LASER

BACKGROUND OF THE INVENTION

1. Field of the Invention

This invention relates to a solid state laser which can have large power output and generate a high-quality laser beam.

2. Description of The Related Art

Referring first to FIG. 2, there is shown the configuration of a conventional solid state laser disclosed in the U.S. Pat. No. 4,918,704 (1990). In this figure, reference numeral 1 represents a rod type solid-state laser medium (hereunder sometimes referred to simply as a laser rod); 2 a total reflection mirror; 3 a partially transparent output coupling mirror (hereunder sometimes referred to simply as an output mirror), the reflectivity of which changes according to a Gaussian-like function in the radial direction (namely, in the direction perpendicular to an optical axis 9 of a laser resonant cavity); 4 a flash lamp for illuminating and pumping the laser rod 1; and 5, 6 and 7 solid state elements for Q-switching. Namely, reference numeral 5 denotes a dielectric multi-layer polarizer; 6 a quarter wave plate; and 7 a Pockels cell.

The radius of curvature of a reflection surface 2A of the mirror 2 is established in such a manner that the rays of laser light reflected by the mirror 2 become parallel rays. Further, the radius of curvature of a reflection surface 3A of the mirror 3 is established radius of curvature of the reflection surface 2A of the mirror 2, namely, is established in such a fashion that laser light progresses in the cavity to the mirror 2 expanding a beam diameter or radius and is then incident on the reflection surface 2A of the mirror 2 so as to cause laser oscillation. Incidentally, an output surface 3B of the mirror 3 has the same radius of curvature as the reflection surface 3A. Furthermore, the laser rod 1 has a property of giving rise to a thermal lensing effect when undergoing an optical pumping.

With the above described configuration, the conventional solid state laser operates as follows. First, the laser rod 1 is pumped by the flash lamp 4. Thereafter, the Pockels cell 7 is activated when the pumping degree or rate of the laser rod 1 reaches a maximum value. Then, an optical path provided in the resonant cavity, which has been intercepted by the polarizer 5 and the quarter wave plate 6, becomes transparent optically. Thus the laser rod 1 comes to perform a lasing operation. Consequently, a laser oscillation is commenced in the resonant cavity.

Subsequently, as illustrated in FIG. 3, laser light reflected by the reflection surface 3A of the mirror 3 is amplified while going through the laser rod 1, expanding the beam diameter. The laser light is then incident on the total reflection mirror 2, further expanding the beam diameter. Then, rays of the laser light are reflected by the reflection surface 2A of the mirror 2 and become parallel to the optical axis 9 of the resonant cavity. Afterwards, the laser light is incident on the laser rod 1 again and then is amplified while going through the laser rod 1. Finally, the laser light is incident on the reflection surface 3A of the output mirror 3 parallel with the optical axis 9 of the resonant cavity. As described above, the reflectivity of the reflection surface 3A of the mirror 3 is represented by a Gaussian-type function. Thus a transverse mode of laser output light, which is transmitted by the mirror 3 and is then output to the outside of the laser oscillator, has a smooth profile and becomes parallel to the optical axis 9 of the resonant cavity.

Meanwhile, when the temperature of the laser rod 1 becomes high to the extent sufficient to cause a thermal lensing effect, the course of laser light travelling through the inside of the laser rod 1 is changed or turned. Thus, when the thermal lensing effect is caused, the laser light travelling through the resonant cavity is incident on the output mirror 3 by being converged or diverged. As a result, laser output light drawn out of the resonant cavity converges or diverges.

Thus, if input power as radiated pumping light is increased in order to also increase output power of the laser oscillator, thermal lensing effects of the laser rod 1 become increased. As a consequence, laser light is incident on the mirror 3, converging or diverging. Then, the laser light is output from the output surface 3B of the mirror 3, converging and diverging.

Meanwhile, the wavelength converting efficiency of a non-linear crystal (not shown) decreases when a diverging angle of incident laser light increases. The conventional solid state laser, accordingly, has a drawback in that when the laser output light is made to be incident on the non-linear crystal, the wavelength converting efficiency falls and high-average-output laser light, the wavelength of which is converted, cannot be obtained.

Further, to eliminate this drawback, it is devised to enlarge the radius of curvature of the reflection surface 2A of the total reflection mirror 2 in such a way that the rays of laser light reflected by the mirror 2 becomes parallel rays when the laser light is emitted from the laser rod 1.

However, if the radius of curvature of the surface 2A of the mirror 2 is increased, the laser light reflected by the reflection surface 2A and transmitted by the laser rod 1 becomes as illustrated in FIG. 4. Therefore, the conventional solid state laser has another drawback in that useless regions 10, which do not contribute to a lasing operation at the time of performing laser oscillation, increase in the laser rod 1.

The present invention is created to eliminate the drawbacks of the conventional solid state laser.

It is, therefore, an object of the present invention to provide a solid state laser which can efficiently obtain parallel rays of high-quality laser output light having high-average-output power and a converted wavelength even when a thermal lensing effect of a solid-state laser medium becomes enlarged by increasing input optical-pumping power.

SUMMARY OF THE INVENTION

To achieve the foregoing object, in accordance with an aspect of the present invention, there is provided a solid state laser which comprises a solid state laser medium, laser-medium pumping means for performing an optical-pumping of the solid state laser medium, optical reflection means having a pair of a total reflection member for performing a total reflection of oscillating laser light and an output member for transmitting and outputting a part of the oscillating laser light, a reflection surface of which is coated with a reflection film having a Gaussian-type reflectively distrubution in the direction perpendicular to an optical axis of the solid state laser medium. In this solid state laser, the radius of curvature of the reflection surface of the output member, which depends on the reflectivity distribution thereof, is established in such a manner that laser oscillation is efficiently performed between the total reflection member and the output member. Moreover, the radius of curvature of an output surface of the output member is established in such a way that rays of resonance light, which are incident through the solid state laser medium thereon when laser oscillation is effected, become parallel rays. Incidently, the resonance light includes converging light and diverging light.

Thus, laser oscillation can be efficiently effected by the solid state laser medium placed between the reflection surface of the total reflection member and that of the output member, the radius of curvature of which is established as above described. Further, rays of lase light emitted from the solid state laser medium as resonance light can be output as parallel rays from the output surface of the output member, the radius of curvature of which is established as described above. Accordingly, even when solid state laser medium causes a thermal lensing effect (namely, the solid state laser medium is made to behave like a positive or convex lens), laser output light with large output power and high-quality can be surely obtained as parallel rays.

Further, in an embodiment of the present invention, the reflection surface of the output member and that of the total reflection member are established in such a manner that the ratio of the beam diameter (namely, the diameter of a section of a laser beam, at which the intensity is $(1/e^2)$ times the maximum intensity) of laser light reflected by these reflection surfaces to the primary dimension (namely, the maximum dimension of the transversal section thereof (for instance, the diamter thereof if the transversal section is circular. Further, the length of the longer diagonal line if the transversal section is rectangular) of surfaces of incidence and emission (hereunder sometimes referred to as input/output surfaces) of the solid state laser medium becomes within a range of 0.3 to 0.7 (preferably, within a range of 0.4 to 0.6).

Thereby, laser oscillation can be efficiently performed between the reflection surface of the output member and that of the total reflection member. Namely, the maximum region, which is able to contribute to a lasing operation at the time of effecting laser oscillation, in the solid state laser medium can be utilized.

Furthermore, in another embodiment of the present invention, a non-linear crystal for converting the wavelength of laser output light, which is output from the output surface of the output member of the optical reflection means, is provided at the outer side of the output member thereof.

Thereby, the wavelength of the laser output light, the rays of which are parallel rays, can be converted by the non-linear crystal efficiently. Namely, efficiency in the wavelength conversion can be substantially increased and thus output laser light with high-average output power can be obtained by taking parallel rays of laser output light of the laser oscillator.

BRIEF DESCRIPTION OF THE DRAWINGS

Other features, objects and advantages of the present invention will become apparent from the following description of a preferred embodiment with reference to the drawings in which like reference characters designate like or corresponding parts throughout several views, and in which.

DETAILED DESCRIPTION OF THE PREFERRED EMBODIMENT

Hereinafter, the preferred embodiment of the present invention will be described in detail by referring to the accompanying drawings.

Figure 1:
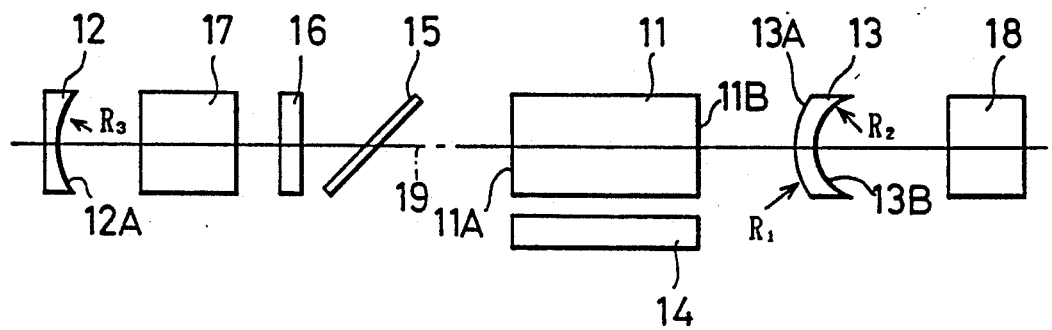
FIG. 1 is a schematic block diagram for illustrating the configuration of a solid state laser embodying the present invention.
Figure 2:
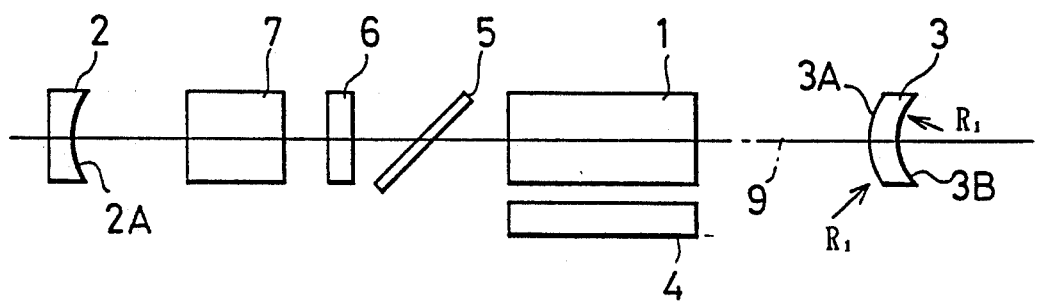
FIG. 2 is a schematic block diagram for illustrating the conventional solid state laser.
Figure 3:
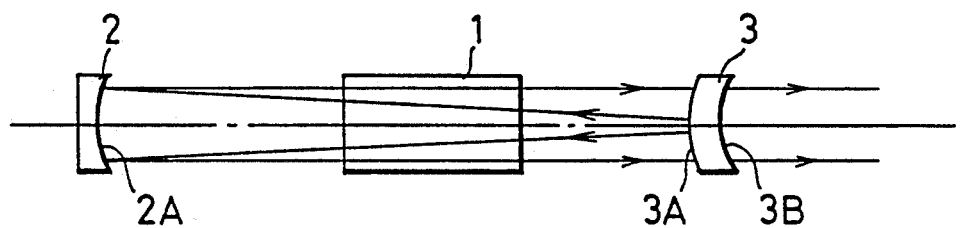
FIG. 3 is a diagram for illustrating a laser-oscillation operation of the conventional solid state laser of FIG. 2.
Figure 4:
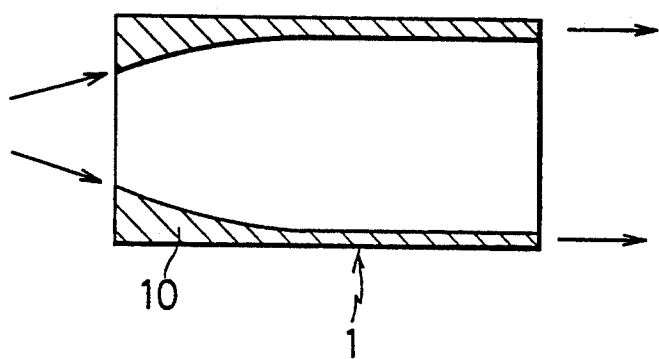
FIG. 4 is a diagram for illustrating useless regions of the conventional solid state laser, which do not contribute to laser oscillation of the solid state laser medium thereof.
Figure 5:
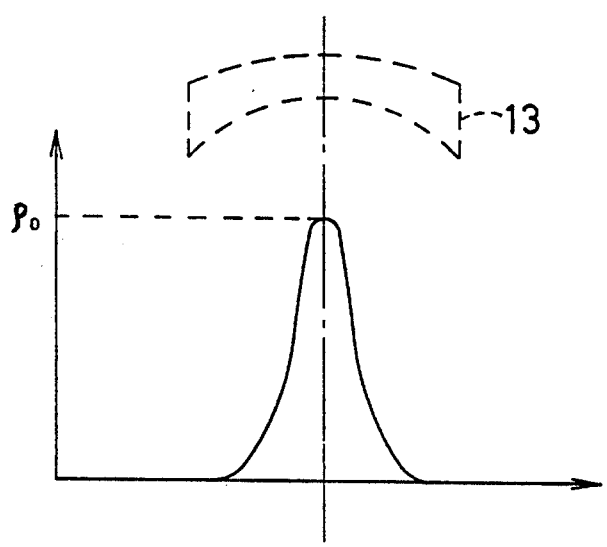
FIG. 5 is a graph for illustrating the reflectivity distribution on the reflection surface of an output mirror of the solid state laser of FIG. 1.

FIG. 1 is a schematic block diagram of a solid state laser embodying the present invention. In this figure, reference numeral 11 denotes a rod type solid state laser medium and is made of, for example, a crystal of $Y_{3-x}Nd_xAl_5O_{12}$ (namely, Nd:YAG). Further, reference numeral 12 designates a total reflection mirror (to be employed as the total reflection member of the optical reflection means); and 13 an output mirror (to be employed as an output member of the optical reflection means). This output mirror 13 is fabricated by forming a dielectric multi-layer film made of, for instance, $SiO_2$, $ZnO_2$ or $TiO_2$ on a transparent substrate made of $SiO_2$ or the like by effecting a vapor deposition in such a manner that the reflectivity distribution thereof in the radial direction (namely, in the direction vertical to the optical axis 19 of the laser resonant cavity) is represented by a Gaussian function. Thus a reflection film having the following field amplitude reflectivity $\rho(r)$ is formed on a reflection surface 13A of the output mirror 13:

$$\rho(r) = \rho_0 \times \exp[-(r/W)^2]$$

where r designates a distance from the optical axis 19 of the resonant cavity; W a predetermined constant of GAUSSIAN function; $\rho_o$ the maximum value of the reflectivity $\rho(r)$. On the other hand, a surface of emission (hereunder sometimes referred to as an output surface) 13B of the output mirror 13 is coated with an antireflection film by using a dielectric multi-layer film in such a fashion that a part of laser light is transmitted from the output surface 13A. Incidentally, FIG. 5 is a graph for showing the reflectivity distribution on the reflection surface 13A in the radial direction.

Further, reference numeral 14 represents a flash lamp employed as a laser medium pumping means for effecting an optical pumping of the solid state laser medium 11; and 15, 16 and 17 solid state elements. Namely, reference numeral 15 denotes a polarizer made of a dielectric multi-layer film; 16 a quarter wave plate; and 17 a Pockels cell made of a KD*P crystal. Furthermore, reference numeral 18 represents a non-linear crystal provided at the side of the output surface 13B of the output mirror 13 for converting or changing the wavelength of laser light output from the output mirror 13 by half wavelength. Incidentally, a crystal of, for instance, KD*P(KD$_2$PO$_4$), KTP(KT$_i$OPO$_4$), LBO(L$_i$B$_3$O$_5$) or BBO(B$_a$B$_2$O$_4$) may be employed as the non-linear crystal 18. Further, the radius R$_1$ of curvature of the reflection surface 13A of the output mirror 13 and the radius R$_3$ of curvature of the reflection surface 12A of the total reflection mirror 12 are set in such a manner that the ratio of the maximum beam diameter of laser light reflected by each of the reflection surfaces 13A and 12A, which is obtained at the time of incidence of the laser light on each of the input/output surfaces 11A and 11B of the solid state laser medium 11, to the diameter of each of the input/output surfaces 11A and 11B becomes within a range of 0.3 to 0.7. Incidentally, the reflection surface 13A of the mirror 13 has a Gaussian type reflectivity distribution which exerts an influence on the maximum beam diameter of the laser light impinging on the input/output surface 11B. Thus the radius R$_1$ of curvature is established by taking this reflectivity distribution into consideration. Thereby, laser light reflected by the total reflection mirror 12 becomes diverging light and then is incident on the input/output surface 11A of the solid state laser medium 11.

Furthermore, the radius R$_2$ of curvature of the output surface 13B of the mirror 13 is established in such a way to make laser light, which converges due to thermal lensing effects of the solid state laser medium 1 and is incident on and is transmitted by the output mirror 13, parallel to the optical axis of the resonant cavity.

Figure 6:
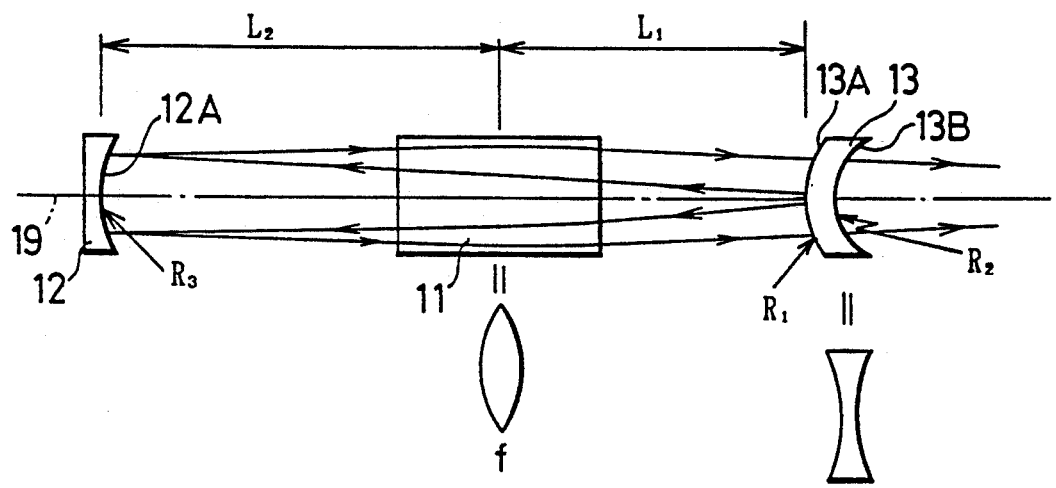
FIG. 6 is a diagram for illustrating a laser oscillation operation of the solid state laser of FIG. 1.

Practically, the radius R$_1$ of curvature of the reflection surface 13A and that R$_2$ of curvature of the output surface 13B of the mirror 13 and that R$_3$ of curvature of the reflection surface 12A of the mirror 12 are set as follows. Namely, the radii R$_1$ and R$_2$ of curvature are determined in such a manner that the curvature of a wave surface of TEM$_{oo}$ beam, which has been incident on the reflection surface 13A on the output mirror 13 and then transmitted by the output mirror 13, becomes infinite on the output surface 13B thereof. To make such calculations, for example, a matrix calculation method disclosed in a publicly known literature (for example, A. E. Siegman, "Lasers" (Mill Valley, Calif.: University Science Books, 1986)). As illustrated in FIG. 6, let L$_1$ denotes the distance between the solid state laser medium 11 and the reflection surface 13A of the output mirror 13; L$_2$ the distance between the laser medium 11 and the reflection surface 12A of the total reflection mirror 12; $\rho(r)$ ($= \rho_o \times \exp[-(r/W)^2]$) the field amplitude reflectivity distribution of the reflection surface 13A of the output mirror 13; f focal length obtained due to thermal lensing effects of the solid state laser medium 11; R$_3$ the radius of curvature of the reflection surface 12A of the mirror 12; R$_1$ the radius of curvature of the reflection surface 13A; and R$_2$ the radius of curvature of the output surface 13B of the mirror 13. Further, $\lambda$ denotes the wavelength of laser light. Then, the following matrix expression (equation (1)) is obtained.

$$\begin{bmatrix} A & B \\ C & D \end{bmatrix} = \quad (1)$$

$$\begin{bmatrix} 1 & L_1 \\ 0 & 1 \end{bmatrix} \begin{bmatrix} 1 & 0 \\ -\frac{1}{f} & 1 \end{bmatrix} \begin{bmatrix} 1 & L_2 \\ 0 & 1 \end{bmatrix} \begin{bmatrix} 1 & 0 \\ -\frac{2}{R_3} & 1 \end{bmatrix} \times$$

$$\begin{bmatrix} 1 & L_2 \\ 0 & 1 \end{bmatrix} \begin{bmatrix} 1 & 0 \\ -\frac{1}{f} & 1 \end{bmatrix} \begin{bmatrix} 1 & L_1 \\ 0 & 1 \end{bmatrix} \begin{bmatrix} 1 & 0 \\ \frac{2}{R_1} & 1 \end{bmatrix} \times$$

$$\begin{bmatrix} 1 & 0 \\ -j\frac{\lambda}{\pi W^2} & 1 \end{bmatrix}$$

$(j = \sqrt{-1})$

Thereby, a complex number q, which is defined by using elements A, B, C and D of the equation (1) as follows, is obtained.

$q = (Aq + B)/(Cq + D)$

Further, let t denotes a thickness of the substrate of the output mirror 13; and n$_B$ a refractive index thereof.

Then, the following matrix expression (equation (2)) is obtained.

$$\begin{bmatrix} A' & B' \\ C' & D' \end{bmatrix} = \begin{bmatrix} 1 & 0 \\ \frac{(n_B - 1)}{R_2} & 1 \end{bmatrix} \begin{bmatrix} 1 & \frac{t}{n_B} \\ 0 & 1 \end{bmatrix} \begin{bmatrix} 1 & 0 \\ \frac{(1 - n_B)}{R_1} & 1 \end{bmatrix} \quad (2)$$

The radius R$_2$ of curvature of the output surface 13B of the output mirror 13 is determined in such a fashion that the real part of a complex number q', which is defined by using elements A', B', C' and D' of the equation (2), becomes equal to zero. Namely, Re[q']=0. thus, the complex number q' is defined by:

$q' = (A'q + B')/(C'q + D')$

Thereby, rays of laser light, which is incident on the output mirror 13 from the solid state laser medium 11 and then is transmitted by the output mirror 13, can be made to be parallel rays.

The solid state laser of this embodiment of the present invention is constructed as above described. Next, an operation of this solid state laser will be described hereinbelow.

First, the rod type solid state laser medium 11 is pumped by light emitted from the flash lamp 14. When the pumping degree or rate of the solid state laser medium 11 reaches a maximum value, the Pockels cell 17 is activated electrically. Then, an optical path provided in the resonant cavity, which has been intercepted by the polarizer 15 and the quarter wave plate 16, becomes transparent optically. Thus the laser medium 11 performs a lasing operation. Consequently, a laser oscillation is started in the resonant cavity. Subsequently, as illustrated in FIG. 6, laser light reflected by the reflection surface 13A of the mirror 13 is amplified while passing through the laser medium 11, expanding the beam diameter.

At that time, the laser medium 11 gives rise to a thermal lensing effect, by which the laser medium 11 is made to behave like a convex lens, as the result of the optical pumping. The relation between the focal length f (meters (m)) of such a convex lens and the average power (kilowatt (KW)) due to the pumped laser medium 11 is expressed by the following equation (3):

$$f(m) \times P(KW) = \text{constant} \qquad (3)$$

This relation limits or restricts a beam-diameter expanding ratio of the laser light. Further, the laser light is then incident on the total reflection mirror 12. Further, the beam diameter is expanded by the output mirror 13 in spite of the restrictions owing to the equation (3). Then, the laser light reflected by the total reflection mirror 12 becomes diverging light and is again incident on the laser medium 11. Afterwards, the incident laser light is amplified while going through the laser medium 11.

At that time, the thermal lensing effect is caused by the optical pumping of the laser medium 11 as above described. Thus, the laser light is incident on the reflection surface 13A of the output mirror 13, converging. In contrast, because the radius $R_1$ of curvature of the reflection surface 13A and that $R_2$ of curvature of the output surface 13B of the output mirror 13 are established as described above, the output mirror 13 acts on transmitted laser light as a concave lens. The rays of the laser light, which has been incident on the reflection surface 13A, converging, are collimated and become parallel to the optical axis 19 of the resonant cavity after passing through the output mirror 13. Furthermore, as described above, the reflectivity of the reflection surface 13A of the mirror 13 is represented by a Gaussian-type function. Thus a transverse mode of laser output light, which is transmitted by the mirror 13, has a smooth profile and is output to the outside of the laser oscillator. Further, the wavelength of the laser output light can be efficiently modulated by the non-linear crystal 18.

Hereinafter, the construction and effects of the foregoing embodiment of the present invention will be described by giving practical figures. First, the solid state laser medium 11 is made of a Nd:YAG crystal, of which the diameter (namely, the primary dimension of the input/output surfaces 11A and 11B thereof) is 6 millimeters (mm) and the length is 100 mm. The radius $R_1$ of curvature of the reflection surface 13A of the output mirror 13 is set as 650 mm. Further, the radius $R_2$ of curvature of the output surface 13B thereof is set as 390 mm. The distance $L_1$ between the laser medium 11 and the reflection surface 13A of the output mirror 13 is 50 mm. Moreover, the distance $L_2$ between the laser medium 11 and the reflection surface 12A of the total reflection mirror 12 is 35 mm. Furthermore, the radius $R_3$ of curvature of the reflection surface 12A of the mirror 2 is set as 5000 mm. When the laser medium 11 causes a thermal lensing effect by undergoing an optical pumping and is made to behave as a convex lens, the focal length of which is 2 meters (m), the beam diameter of laser light on the input/output surfaces 11A and 11B thereof is 0.36 mm$\phi$, which is 0.6 times the diameter of each of the surfaces 11A and 11B. According to the result of an experiment, high-quality collimated Q-switching pulse laser light, of which the peak power exceeds 30 megawatts (MW) and the average output power is 6 W and the wavelength is 1064 nanometer, is obtained. Further, the obtained laser light is closely allied to TEM$_{oo}$. Furthermore, when this laser light is incident on the non-linear crystal 18, wavelength conversion laser output light, of which the average output is 3 W and the wavelength 532 nm, is obtained.

As above described, even when the laser medium 11 causes a thermal lensing effect and is made to behave like a convex lens as a result of an optical pumping thereof, laser output light with high-output-power and high-quality can be surely obtained as parallel rays.

Moreover, as a consequence of obtaining the parallel rays of laser light output from the laser oscillator, the efficiency in converting or changing the wavelength of the laser light in the non-linear crystal 18 can be drastically increased and the laser output with converted wavelength and high-average-output-power can be obtained.

Figure 7:
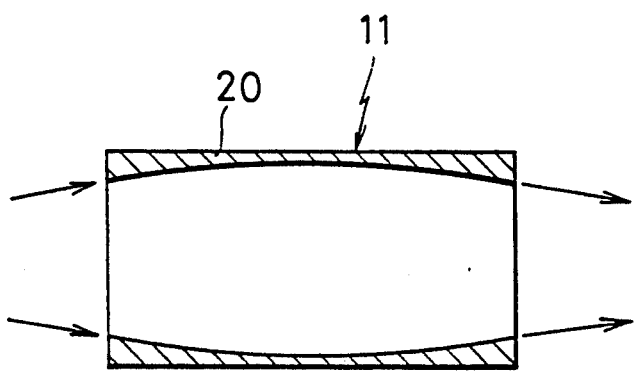
FIG. 7 is a diagram for illustrating useless regions of the solid state laser of FIG. 1, which do not contribute to laser oscillation of the solid state laser medium thereof.

Furthermore, the radius $R_3$ of the reflection surface 12A of the total reflection mirror 12 is established as described above. Thus the solid state laser medium 11 can be effectively utilized as illustrated in FIG. 7. Further, the useless regions 20, which do not contribute to a lasing operation at the time of effecting laser oscillation, can be substantially reduced.

Additionally, there is no necessity of making rays of laser light, which are output from the laser medium 11 to the output mirror 13, parallel rays. Therefore, the degrees of freedom in designing a solid state laser can be substantially increased. This results in that an occurrence of what is called a "hot-spot problem" (namely, a problem that the laser medium is damaged in consequence of a phenomenon that a part of laser light reflected the reflection surface 13A of the output mirror 13 acts as converging light and focuses on the input-/output surface 11B of the laser medium 11) can be surely prevented at a stage of designing a solid state laser.

Further, as an example, has been described hereinabove a case where the laser medium 11 causes a thermal lensing effect and is made to behave as a convex lens. Apparently, the present invention can obtain similar effects even in case of employing a solid state laser medium which has a property of behaving like a concave lens as a result of causing a thermal lensing effect. Incidentally, in such a case, converging light should be employed as laser light (namely, the resonant light), which is incident on the output mirror.

Additionally, in the foregoing embodiment of the present invention, the reflectivity distribution of the reflection surface 13A of the output mirror 13 is a Gaussian distribution. However, a super-Gaussian distribution, which is represented by a super-Gaussian function (e.g., $\rho(r) (=\rho_0 \times \exp[-2(r/W^2]n)$ where n is a predetermined constant), may be employed as the reflectivity distribution of the reflection surface 13A of the output mirror 13.

While preferred embodiments of the present invention have been described above, it is to be understood that the present invention is not limited thereto and that other modifications will be apparent to those skilled in the art without departing from the spirit of the invention. For example, in the foregoing embodiment, the flash lamp 14 used for pumping the laser medium at the longitudinal side thereof is employed as a laser-medium pumping means. However, another flash lamp to be used for pumping the laser medium at an end surface thereof may be employed as the laser-medium pumping means. Furthermore, a broad area type laser diode may be employed as the laser-medium pumping means. Additionally, in the foregoing embodiment, the reflection surface 12A of the total reflection mirror 12 is a concave surface. Further, the reflection surface 13A of the output mirror 13 is a convex surface. Conversely, the reflection surface 12A of the total reflection mirror 12 may be a convex surface. Further, the reflection surface 13A of the output mirror 13 may be a concave surface.

The scope of the present invention, therefore, is to be determined solely by the appended claims.

What is claimed is:

1. A solid state laser comprising:
   a solid state laser medium;
   laser-medium pumping means for performing an optical-pumping of the solid state laser medium; and
   optical reflection means having a total reflection member for performing a total reflection of oscillating laser light and an output member for transmitting and outputting a part of the oscillating laser light, a reflection surface of the output member having a predetermined reflectivity distribution in the direction perpendicular to an optical axis of the solid state laser medium, wherein the reflection surface output member has a predetermined radius of curvature for efficient laser oscillation between the total reflection member and the output member, and wherein the radius of curvature of an output surface of the output member is established in such a way that rays of resonance light, which are incident through the solid state laser medium thereon when laser oscillation is effected, become parallel rays.

2. The solid state laser according to claim 1, wherein the reflection surface of the output member has a Gaussian reflectivity distribution or a super-Gaussian reflectivity distribution.

3. The solid state laser according to claim 2, wherein the radius of curvature of the reflection surface of the output member, the radius of curvature of the output surface of the output member and the radius of curvature of a reflection surface of the total reflection member are determined in such a manner that the following equations (1) to (4) hold good and a real part of a complex number $q'$ is equal to zero:

$$\begin{bmatrix} A & B \\ C & D \end{bmatrix} = \begin{bmatrix} 1 & L_1 \\ 0 & 1 \end{bmatrix} \begin{bmatrix} 1 & 0 \\ -\frac{1}{f} & 1 \end{bmatrix} \begin{bmatrix} 1 & L_2 \\ 0 & 1 \end{bmatrix} \begin{bmatrix} 1 & 0 \\ -\frac{2}{R_3} & 1 \end{bmatrix} \times \begin{bmatrix} 1 & L_2 \\ 0 & 1 \end{bmatrix} \begin{bmatrix} 1 & 0 \\ -\frac{1}{f} & 1 \end{bmatrix} \begin{bmatrix} 1 & L_1 \\ 0 & 1 \end{bmatrix} \begin{bmatrix} 1 & 0 \\ \frac{2}{R_1} & 1 \end{bmatrix} \times \begin{bmatrix} 1 & 0 \\ -j\frac{\lambda}{\pi W^2} & 1 \end{bmatrix} \tag{1}$$

$$(j = \sqrt{-1})$$

$$q = (Aq + B)/(Cq + D) \tag{2}$$

$$\begin{bmatrix} A' & B' \\ C' & D' \end{bmatrix} = \begin{bmatrix} 1 & 0 \\ \frac{(n_B - 1)}{R_2} & 1 \end{bmatrix} \begin{bmatrix} 1 & \frac{t}{n_B} \\ 0 & 1 \end{bmatrix} \begin{bmatrix} 1 & 0 \\ \frac{(1 - n_B)}{R_1} & 1 \end{bmatrix} \tag{3}$$

$$q' = (A'q + B')/(C'q + D') \tag{4}$$

where $R_1$ represents the redius of curvature of the reflection surface of the output member; $R_2$ the radius of curvature of the output surface of the output member; $R_3$ the radius of curvature of the reflection surface of the total reflection member; $L_1$ the distance between the solid state laser medium and the reflection surface of the output member; $L_2$ the distance between the solid state laser medium and the reflection surface of the total reflection member; f focal length obtained due to thermal lensing effects of the solid state laser medium; $\lambda$ wavelength of laser light; W a predetermined constant of the Gaussian or super-Gaussian distribution; t a thickness of the output member; and $n_B$ a refractive index of the output member.

4. The solid state laser according to claim 1, wherein the reflection surface of the output member and that of the total reflection member are established in such a manner that the ratio of the beam diameter of laser light reflected by these reflection surfaces to the primary dimension of input/output surfaces of the solid state laser medium becomes within a range of 0.3 to 0.7.

5. The solid state laser according to claim 1, wherein a non-linear crystal for converting the wavelength of laser output light, which is output from the output surface of the output member of the optical reflection means, is provided at the outer side of the output member thereof.

6. The solid state laser accoding to claim 5, wherein the non-linear crystal is made of $KD^*P(KD_2PO_4)$ and adapted to change the wavelength of the laser output light output from the output surface of the output member by half thereof.

7. The solid state laser accoding to claim 5, wherein the non-linear crystal is made of $KTP(KT_iOPO_4)$ and adapted to change the wavelength of the laser output light output from the output surface of the output member by half thereof.

8. The solid state laser accoding to claim 5, wherein the non-linear crystal is made of $LBO(L_1B_3O_5)$ and adapted to change the wavelength of the laser output light output from the output surface of the output member by half thereof.

9. The solid state laser accoding to claim 5, wherein the non-linear crystal is made of $BBO(B_aB_2O_4)$ and adapted to change the wavelength of the laser output light output from the output surface of the output member by half thereof.

10. The solid state laser accoding to claim 1, wherein the total reflection member is a total reflection mirror and the reflection surface of the total reflection member is a concave surface, wherein the output member is an output mirror and the reflection surface of the output member is a convex surface.

11. The solid state laser accoding to claim 1, wherein the total reflection member is a total reflection mirror and the reflection surface of the total reflection member is a convex surface, wherein the output member is an output mirror and the reflection surface of the output member is a concave surface.

* * * * *